United States Patent [19]

Steiner

[11] Patent Number: 4,862,392
[45] Date of Patent: Aug. 29, 1989

[54] GEOMETRY PROCESSOR FOR GRAPHICS DISPLAY SYSTEM

[75] Inventor: Walter R. Steiner, Ormond Beach, Fla.

[73] Assignee: Star Technologies, Inc., Sterling, Va.

[21] Appl. No.: 838,300

[22] Filed: Mar. 7, 1986

[51] Int. Cl.[4] ............................................... G09B 9/08
[52] U.S. Cl. .................................. 364/522; 364/518; 364/521; 340/747
[58] Field of Search ... 364/518, 521, 522, 200 MS File, 364/900 MS File; 340/724, 734, 747, 750, 799

[56] References Cited

U.S. PATENT DOCUMENTS

| | | |
|---|---|---|
| 4,181,953 | 1/1980 | Osofsky ............................... 364/522 |
| 4,609,917 | 9/1986 | Shen ..................................... 364/522 |
| 4,625,290 | 11/1986 | White ................................... 364/522 |
| 4,631,690 | 12/1986 | Corthout et al. .................... 364/518 |

FOREIGN PATENT DOCUMENTS 0152741 9/1985 European Pat. Off. .

Primary Examiner—Gary V. Harkcom
Assistant Examiner—Phu K. Nguyen

Attorney, Agent, or Firm—Spensley Horn Jubas & Lubitz

[57] ABSTRACT

A geometry process or for use in a graphics processing system, especially adapted to couple with a hierarchically structured graphics database memory, a special purpose processor for traversing the database, and a display processor, wherein the geometry processor includes double-buffered input registers, a first private data bus to the special purpose traversing processor, a second private data bus to the graphics database memory, a high-speed arithmetic processing module, a double-buffered output register, and a microprogrammable control system. The geometry processor is configured to process the graphics database in two passes. The first pass is a culling operation that culls out graphics data supplied from the database memory that is outside of a defined viewing volume, with the culled data being sent over of the first private bus to a stack memory in the traversing processor. The second pass retraverses the culled data, along with additional associated data from the database memory, from the traversing processor's stack memory and transforms that data from a three-dimensional mathematical format to a two-dimensional format suitable for display on a video display system.

8 Claims, 7 Drawing Sheets

WORLD COORDINATE SET

GEOMETRY PROCESSOR FOR GRAPHICS DISPLAY SYSTEM

BACKGROUND OF THE INVENTION

1. Field of the Invention

This invention relates to electronic processing systems, and more particularly to an electronic system for manipulating data representing geometrical objects and related information in a computer graphics display system.

2. Background Information

The synthesis of visual scenes through the use of computers (computer graphics) is a growing area of computer science. There are innumerable applications of computer graphics, including computer-aided design (CAD), the synthesis of demonstrative charts, creation of titles and other graphics displays for television use, and the simulation of physical events.

In order to facilitate the generation of a scene including one or more objects by computer, normally the first step is to create a three-dimensional description of the objects to be displayed and to store them in mathematical form in a graphics data base. The data is then processed and manipulated so that the scene can be imaged on a display screen.

The processing of information from a graphics data base can be thought of as involving four basic functions:

1. Extracting data corresponding to some part of a graphics object from the graphics data base;
2. Determining which areas of the graphics object are to be visible on the display screen;
3. Transforming the three-dimensional description of the graphics object to a two-dimensional description in display screen coordinates; and
4. Selecting the pixels of the display screen which must be activated to display the object, defining their color and intensity, and activating them to form the desired graphics image.

The present invention is concerned with the second and third processing steps.

One format for storing a graphics data base is referred to as a "hierarchical display list", in which graphics data describing various objects (or pieces of objects) are stored in "segments". Each segment can be thought of as representing a graphics object. Each segment can have one or more segments associated with it in a "parent-child" relationship. The child segment of a parent segment may in turn have one or more child segments associated with it. This parent-child relationship between segments results in a hierarchical inverse "tree" structure.

Each segment of a hierarchical graphics data base typically has structural information which includes "pointers" to parent, child, and "sibling" segments. Sibling segments are those segments having the same parent segment. A pointer to a segment identifies the starting location of that segment in a computer system memory or storage device. In addition to the hierarchical structural data, each segment may also contain a graphics primitive and attributes of the primitive. A graphics primitive is typically a simple planar object, such as a polygon or a vector, defined by a list of coordinates in a convenient three-dimensional coordinate system for that particular graphics primitive. Attribute data for a graphics primitive may define the color or other characteristics of the primitive, and may also include a transformation matrix which specifies the spatial position and orientation of the graphics primitive of that segment with respect to the coordinate system of its parent segment. A feature of one type of hierarchical graphic data base is that attribute information, if not different from the parent segment, need not be defined in the child segment, but can instead be "inherited" from the parent segment.

Computer systems often include peripheral processors to increase the computational speed of the overall system. Peripheral processors are typically specialized computational systems designed to efficiently perform one or more functions. One such peripheral processor is a graphics processor which is designed to accept data from a graphics data base, select portions of that data to be further processed, perform the further processing, and transfer the processed data to another special purpose processor for display on a display screen.

Such graphics processors are used in a variety of applications. For example, interactive CAD systems often utilize graphics processors in conjunction with a host computer to store and display a model of the object or objects to be designed. A designer directs the system through various input devices to create the model, often on a piece-by-piece basis. The various pieces of the model form a graphics data base which is stored by the graphics processor and displayed on command. Changes to the model by the designer cause the system to modify the data base and update the display screen to image the modified model.

An appropriately designed graphics processor, in response to commands from a host computer, can create, copy, or delete segments of a hierarchical data base, which is typically stored in a separate memory of the graphics processor. The graphics processor further can delete, add, or modify various graphics data (such as the attributes, graphics primitives, and transformation matrix within each segment of the graphics data base) in response to host level commands. Once the hierarchical data base has been completed, the graphics processor reads and processes the graphics data base, producing images on a display screen of the objects represented by the graphics data base, as viewed through a user-defined "viewport". In reading the graphics data base, the graphics processor "traverses" the data base by reading data from a first segment of the data base and then moving to a relative segment (either parent, child, or sibling) identified by the first segment's pointers, in accordance with a traversal algorithm. In this manner, the graphics processor traverses the segment "tree" until the data in the graphics data base has been processed.

Because graphics processing is an extremely computation intensive processing task, in order to process the graphics data base in a reasonable amount of time, a peripheral graphics processor may employ a number of special purpose subprocessors to perform separate portions of the overall task. One such subprocessor is a geometry processor.

A sophisticated geometry processor can perform a number of processing function on the graphics data base of the segments. One important function is to test the graphics primitives of each segment to determine whether the primitives are within the field of view defined by the viewport. If not, the segment, and all of its children segments, can be ignored for purposes of further processing, thus increasing overall processing speed.

Additional geometry processor functions can include concatenation of transformation matrices to produce a transformation matrix for each segment which can transform the graphics primitive coordinate set of the segment into the coordinate set of the viewport segment at the "top" of the inverted tree structure. Also, the geometry processor can "clip" partially visible graphics primitives so that those portions of any primitives extending outside the field of view are not processed.

Graphics primitives which are defined in three dimensions must be projected to the two-dimensional image plane of the display. Two principal projection techniques are parallel projection and perspective projection. Parallel projection can be performed by simply ignoring the third coordinate (depth) of the three dimensional coordinate set. Perspective projection can be performed by dividing the components of the first two coordinates (height and width) by the third component (depth) to give the effect of a diminishment in size for those primitives which are "farther" from the viewer.

Once a graphics primitive has been clipped, projected, and/or otherwise transformed, a geometry processor can convert the coordinates of the primitive to the "hardware coordinates" used to display the primitives on a display screen. From the hardware coordinates, the primitives are "rasterized" by a display processor, which converts the hardware coordinates of the primitives into a collection of pixels. Once a primitive has been rasterized, hidden surfaces caused by overlapping primitives are removed.

It can be appreciated from the above that an extensive amount of calculation is often required to process and display the graphics primitive of a segment. Complex models can encompass a data base of thousands of segments. As a result, a graphics processor can require a significant amount of time to convert the data in a graphics data base into an image on a screen. Thus, it is desirable to develop a graphics processor architecture having a very high graphics processing speed. It is further desirable to develop a graphics processor architecture that uses a multitude of subprocessors to divide the complex task of processing a graphics data base into an image in order to achieve higher efficiencies and processing speed. It is therefore desirable to develop a high-speed graphics geometry processor to share the task of processing a graphics data base.

The present invention accomplishes these and other objects by means of a geometry processor having a novel internal processing architecture and system architecture that permits fast and efficient processing of a graphics data base with a simple yet powerful design.

SUMMARY OF THE INVENTION

It is an object of the present invention to provide a novel geometry processor that significantly improves the processing rate of graphics data in a graphics processing system. These and other objects and advantages are achieved in a geometry processor having a unique internal and system architecture which facilitates the processing of a graphics data base.

There are three characteristics that are highly desirable in a geometry processor. The first characteristic is a high data transfer rate in and out of the geometry processor. The second characteristic is provision for performing a large number of different mathematical operations, such as multiplication, division, matrix dot products, matrix cross products, square roots, etc. A sequence of these mathematical computations will be referred to as an algorithm. The third characteristic is high degree of programability, so that new algorithms and processes can be accommodated.

The more precision used in a mathematical operation, the wider the range of applications to which the geometry processor can be applied. Some applications require 32-bit floating point numbers, while others may only need 16-bit fixed point number precision. A balance must be achieved between higher precision (which involves a more expensive system), greater flexibility to perform various algorithms, and system processing speed. It is highly desirable to execute a variety of algorithms and transfer data as fast as possible in order to provide the user with a highly interactive graphics system. Generally, however, the higher the speed, the more the system will cost.

Therefore, a system comprising distributed processors for accomplishing the necessary steps to display a graphics data base has numerous advantages.

In the illustrated embodiment, the inventive geometry processor is coupled to (a) a terminal processor for creating and maintaining a graphics data base in response to commands from the host computer, (b) a tree traverser processor that independently traverses the data base, rapidly reading the segments of graphics data at a rate optimized for geometry processing, and (c) a display processor for converting processed data base segments into a visual image.

The tree traverser processor rapidly addresses the graphics processor memory storing the graphics data base, and provides a stream of graphics data segments over a high-speed display list memory bus to the geometry processor. The geometry processor culls out segments that will not be visible on the display screen, and transfers the attribute data of "visible" segments over a second, streamlined stack bus linking the geometry processor with a stack memory resident in the tree traverser processor. Such an arrangement has been found to markedly increase the rate at which graphics data may be read and processed from the graphics data base.

Once the last segment of a traversal path has been reached, the tree traverser reverses direction, retracing visible segments of the path by reading out culled segments from its stack memory. During the reverse traversal, the attribute data of the visible segments is transferred from the tree traverser stack memory over the stack bus back to the geometry processor. In addition, the tree traverser addresses the associated graphics primitives of the visible segments stored in the graphics data base, and transfers the graphics primitives over the display list memory bus to the geometry processor for further processing. Such an arrangement has been found to significantly increase the utilization rate of the geometry processor and the data processing rate of the graphics processor system as a whole. As a result, images on a display screen can be updated at a very fast rate in response to modifications to the graphics data base.

The inventive geometry processor described herein is part of a graphics processing system described in greater detail in a pending application entitled "Improved Graphics Processor", Ser. No. 06/840,459, by Walter Robert Steiner, Anthony John Pelham, and William Scott Didden, and assigned to the assignee of the present application.

The preferred embodiment of the geometry processor is capable of handling data transfer rates of more than 100 megabytes per second, and computational rates of 100 million instructions per second or 30 million 32-bit floating point instructions per second, with microprogram control of the geometry processor hardware to provide a high degree of flexibility in implementing a variety of geometry processing algorithms. The inventive geometry processor incorporates a special 32-bit floating point accumulator design to perform a sum of products very efficiently. This design is more fully described in the pending application entitled "Floating Point Accumulator Circuit", Ser. No. 06/818,284, by Paul A. Simoncic and Walter R. Steiner, and assigned to the assignee of the present application.

The geometry processor also incorporates a novel 32-bit floating point mathematical transformation circuit that performs division and square root operations, as well as curve approximation calculations, at a high data rate. This transformation circuit is more fully described in the pending application entitled "Linear Approximation Transform Circuit", Ser. No. 06/819,346, by Walter R. Steiner and William E. Peregoy, and assigned to the assignee of the present application now abandoned.

The present application also incorporates a multifunction arithmetic logic unit circuit having special decision hardware used to accelerate culling, clipping, and other algorithms programmed into the geometry processor. This circuit is more fully described in the pending application entitled "Multifunction Arithmetic Logic Unit Circuit", Ser. No. 06/824,053, by Walter R. Steiner and Paul A. Simoncic, and assigned to the assignee of the present invention.

The geometry processor in its preferred embodiment is a single board, pipelined, programmable, fixed-point or floating-point arithmetic processor specifically tailored to execute geometric algorithms used for graphics purposes. The invention will become better understood by reference to the following detailed description when taken in conjunction with the accompanying drawings showing the preferred embodiment of the invention.

BRIEF DESCRIPTION OF THE DRAWINGS

Like reference numbers in the various drawings refer to like elements.

DETAILED DESCRIPTION

Overview of Operational Environment

Figure 1:
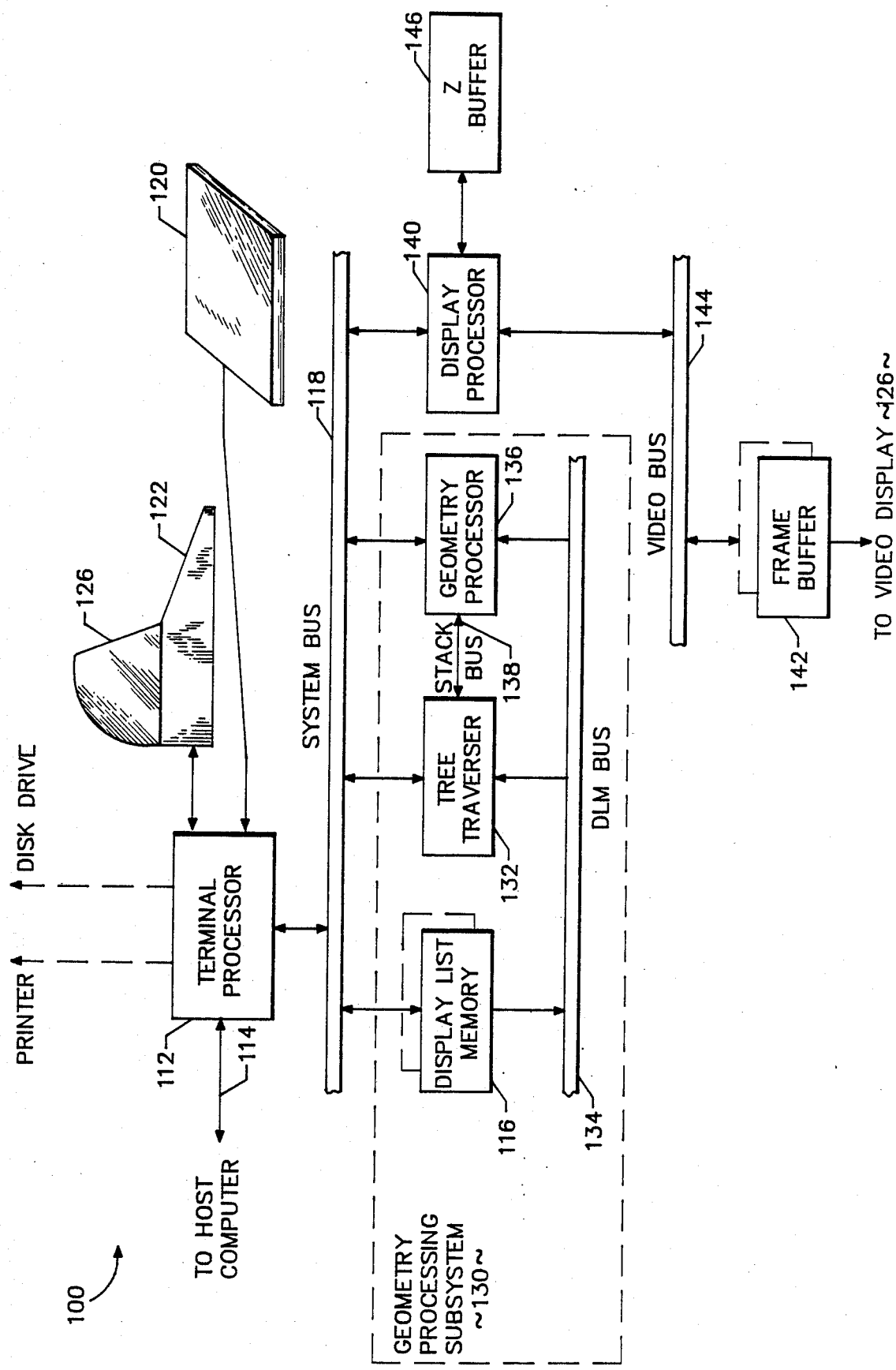
FIG. 1 is a schematic diagram of a graphics processor system incorporating the inventive geometry processor.

FIG. 1 shows a schematic diagram of a graphics processor system 100 incorporating the inventive geometry processor. The graphics processor system 100 includes a terminal processor 112 which executes host level commands received from a host computer (not shown) through a host interface 114. A majority of the host level commands are directed to building and managing a graphics data base in the form of a hierarchical display list which is stored in a display list memory ("DLM") 116. The terminal processor 112 communicates with the DLM 116 over a general purpose system bus 118 which, in the illustrated embodiment, is a standard 32-bit "VMEbus". The specifications for the VMEbus standard may be found in the VMEbus Specification Manual, Rev. B, August 1982, VMEbus Manufacturers Group.

Host level commands are sent by a host application program resident on the host computer. The user of the host application program can also input data directly into the graphics processor system 100 using a variety of graphics input devices, such as a graphics tablet 120, an alphanumeric keyboard 122, or various other input devices such as joysticks, mice, dial boxes, and track balls (not shown). The input from these devices can be utilized to issue graphics commands to modify the graphics data base, change viewing parameters, and pan or zoom the graphics display provided by a visual display 126. In this manner, applications such as CAD systems may have interactive local control of the display 126.

A geometry processing subsystem 130 couples to the terminal processor 112 by means of the system bus 118. The geometry processing subsystem 130 includes a tree traverser processor 132 for rapidly reading the hierarchical display list stored in the DLM 116. Coupled to the tree traverser 132 by a bidirectional stack bus 138 is the geometry processor 136 of the present invention.

The geometry processor 136 performs all graphics calculations for the geometry processing subsystem 130. The tree traverser 132 traverses the data base stored in the DLM 116 segment b segment, sequentially addressing the data of each segment by means of a DLM bus 134. This traversal converts the tree structure of the DLM 116 into a stream of data which is transmitted over the DLM bus 34 to the tree traverser 132 and to the geometry processor 136. The geometry processor 136 performs the processing functions of culling, clipping, projecting, and transformation matrix concatenation. The overall functions of the geometry processing subsystem 130 are more fully explained in the aforementioned application entitled "Improved Graphics Processor".

As will be explained in greater detail below, the geometry processor 136 does not fully process each graphics primitive before proceeding to the next primitive. Instead, the geometry processor 136 transfers graphics attribute data (such as color attributes) and transformation data directly to the tree traverser 132 over the stack bus 138 if, during the culling process, the geometry processor 136 determines that the associated graphic primitive is potentially visible. The tree traverser 132 stores the attribute and transformation data from the geometry processor on an internal stack memory on a first-in/last-out basis. Through constant communication with the tree traverser 132, the geometry processor 136 ensures that attribute and transformation data for visible segments only is stored in the tree traverser stack memory.

Once the tree traverser 132 reaches the last segment of a traversal, the tree traverser reverses direction, retraversing the potentially "visible" segments (that is, the segments having potentially visible graphics primitives) indicated by the data stored in the tree traverser stack memory. As the tree traverser 132 retraces the traversal path from segment to segment, the tree traverser transfers the graphics data for each segment stored in its stack memory back to the geometry processor 136 over the stack bus 138. At the same time, the tree traverser 132 addresses additional graphics data stored in the DLM 116 which comprises the graphics primitive associated with the current segment being transferred back to the geometry processor 136. The graphics primitive is transferred to the geometry processor 136 over the DLM bus 134. The geometry processor 136 utilizes the data from the tree traverser stack memory and from the DLM 116 to perform what is known as "face" processing, which transforms the graphics data for display. In the illustrated embodiment, the geometry processor 136 clips and projects the graphics primitive of a visible segment and performs a portion of the appropriate shading calculations. Once completed, the geometry processor 136 passes the graphics primitive along with inherited attributes in the format of an "edge packet" across the system bus 118 to a display processor 140. The display processor 140, in conjunction with a Z-buffer 146 and a frame buffer 142, performs rasterization, hidden surface removal, and the remainder of the shading calculations. The function of the display processor 140 is more fully described in the pending application entitled "Display Processor for Graphics Display System", Ser. No. 06/832,518, by William A. Kelly, David E. Orton, and Gregory N. Stock, assigned to the assignee of the present invention.

Thus, the architecture of the graphics processing subsystem 130 balances high-speed processing against system cost by utilizing the geometry processor 136 for both culling and face processing, and the tree traverser 132 for traversing and retraversing.

Hierarchical Data Base Structure

Figure 2:
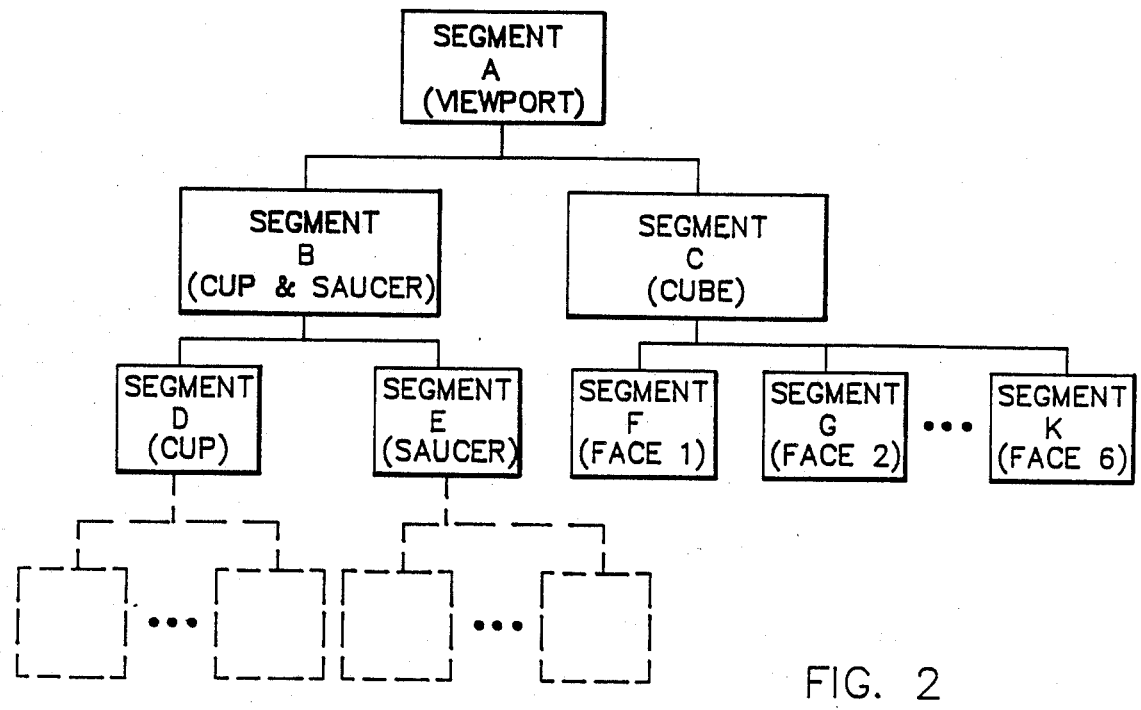
FIG. 2 is a diagramatic example of the inverse tree hierarchical data base structure used in conjunction with the present invention.
Figure 3:
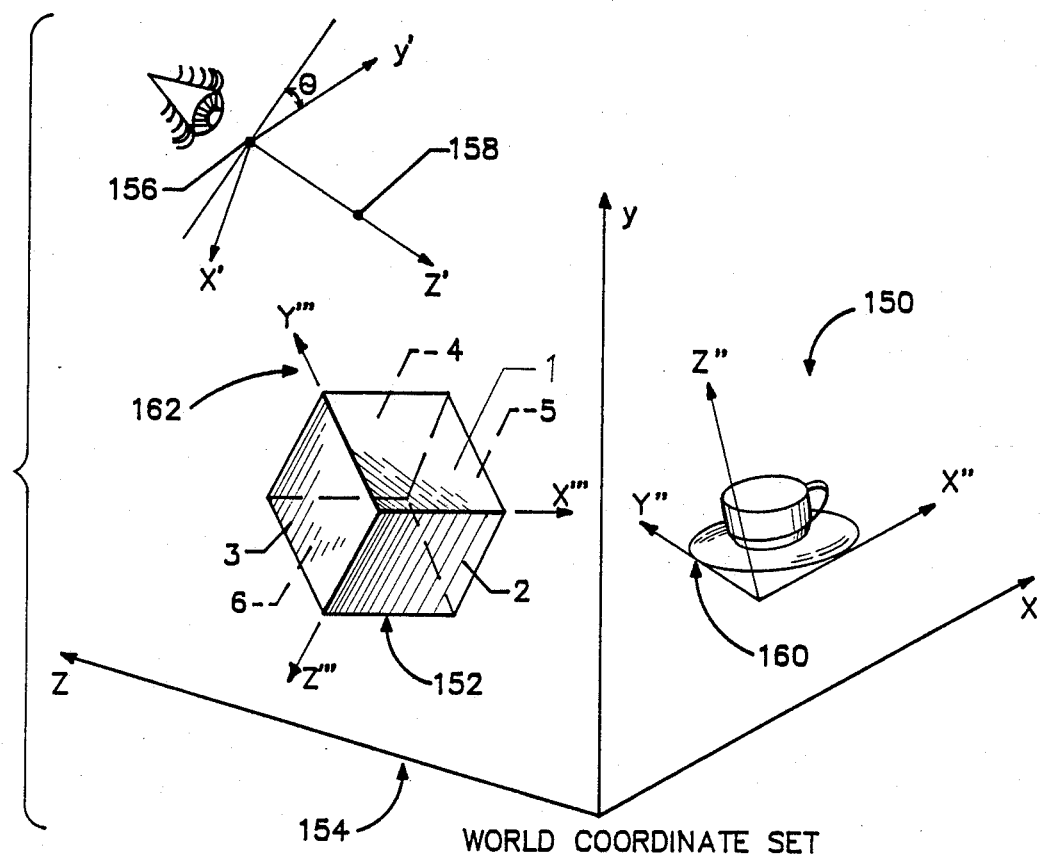
FIG. 3 is a diagramatic example of two graphics objects with different coordinate sets.

In order to better understand the operation and design of the graphics processor system 100, a simplified example of a tree-type hierarchical display list is illustrated in FIG. 2. The display list of FIG. 2 represents and describes the objects shown in FIG. 3, which include a cup and saucer 150 and a cube 152. These simple objects have been selected for purposes of illustration only. In actual practice, the objects which can be modeled may be significantly more complicated.

The cube 152 can be thought of as a collection of six faces 1-6, where each face is represented by a four-sided polygon having a particular color, shading, and spatial relationship to the cube considered as a whole. In this manner, complex objects can be modeled by breaking the object up into simple shapes (graphics primitives) which have associated attribute information.

The basic element in the display list of FIG. 2 is the segment. Each segment can have a graphics primitive (such as a polygon, vector, etc.), attributes (such as polygon color, a transformation matrix, etc.), and structural information (such as pointers to related segments). Each segment of data is divided into two buffers, a culling buffer and a primitive data buffer. The culling buffer contains attribute data and information needed to determine if the associated primitive is visible within a defined field of view. The primitive data buffer contains the data necessary to define the graphics primitive itself.

The root or top segment A of FIG. 2 is the "viewport" definition segment, which defines the vantage angle from which the graphics objects are viewed and the volume of space visible to the viewer. This segment has an associated reference coordinate set designated a "world" coordinate set and represented by the three orthogonal axes 154 in FIG. 3. The spatial relationship between the cup and saucer 150 and the cube 152 is defined in terms of their world coordinates.

An eye point 156 and a sight point 158 (specified in world coordinates) together with a roll angle $\theta$ define a second coordinate set, the "eye" coordinate set. The origin of the eye coordinate set is located at the eye point 156 with the Z axis extending along the line of sight in the direction of the sight point 158. The roll angle $\theta$ defines the angle of rotation of the X and Y axes about the Z axis. The viewing volume is defined by six "clipping planes", which typically form a frustrum. In this manner, the eye coordinate set identifies the vantage angle from which the objects are to be viewed.

A related coordinate set is the eye-scaled coordinate set, in which the X and Y coordinates of the eye coordinate set are scaled to simplify the clipping process. The viewport definition segment A has a transformation matrix to transform coordinates in the world coordinate set to coordinates in the eye coordinate set, and a second viewport matrix to convert the eye coordinates to the eye-scaled coordinate set.

Below the viewport definition segment A of FIG. 2 is a second segment of the display list, designated segment B. Segment B is a child segment of the parent segment A and represents the cup and saucer 150 considered as a whole. Associated with the cup and saucer 150 is a "model" coordinate set 160, which is defined by placing the origin of the model coordinate set at a convenient location and aligning the axes with respect to some of the primitive data. All of the primitive data within one segment is referenced to its associated model coordinate set. Segment B has a transformation matrix which transform points in the segment B model coordinate set to the coordinate set of its parent, segment A (which in this case is the world coordinate set).

Segment B also has pointers to one of its child segments, segment D, and to one of its sibling segments, segment C (which represents the cube 152). Segment C is also a child segment of the parent segment A, and has its own model coordinate set 162, which in this case has an origin placed at one of the vertices of the cube 160 and three axes aligned with edges of the cube. Segment C in turn has six child segments F-K for the six cube faces 1-6, respectively. The segments F-K are quite similar. Segment F, for example, has a pointer to the parent segment C, the sibling segment G, and to a child segment (if any). Segment F has its own model coordinate system in which the four vertices of the polygon defining face 1 are specified. This four-sided polygon is the graphics primitive of segment F. Segment F further defines the color and other attributes of the graphics primitive.

Each segment of the display list is formatted into a number of data buffers which contain the graphics data, and a control block which has pointers pointing to the memory locations in the DLM 116 at which the buffers are located. Each control block comprises a number of words (typically sixteen words) which comprise pointers, flags, and other control data.

One such control block, the segment control block, contains a pointer to the segment's culling buffer which stores the attributes of the associated graphics primitive. Among these attributes is a "bounding box" which is used by the geometry processor 136 in the culling process. The bounding box is a set of eight coordinate points which define a volume that completely contains the graphics primitive for a segment and all of the graphics primitives of all children segments. The bounding box allows the geometry processor 136 to quickly cull out segments that are completely outside the defined field of view by means of simple comparison tests.

Each time the terminal processor 112 enters new graphics data for a segment or alters a transformation matrix, the terminal processor 112 updates the bounding boxes for the entire display list. For example, if a new polygon is entered into one segment, this may increase the size of the bounding box for that segment. If the segment bounding box increases, it may be necessary to increase the size of the bounding box of its parent segment to ensure that the parent segment bounding box includes the new bounding box of the child segment. Thus, changes in one segment may ripple up the display list tree until a segment is reached which is not affected by the change. A flag word in each segment is set when the segment has been modified, indicating that the bounding box for the segment's parent segment may also have to be updated.

Besides the bounding box, the culling buffer also contains attribute data which defines certain characteristics of the segment's graphics primitive. If a particular characteristic is not defined in the culling buffer of a segment, the definition of that characteristic is inherited from the parent segment. For example, if segment C defines its associated graphics primitive (if any) as having the color "red", any of its children (the face segments F-K) which do not locally define the graphics primitive color will inherit the graphics primitive color of "red".

The culling buffer also contains the transformation matrix for transforming the local coordinate set of the segment to the coordinate set of its parent segment. Light source information may also be stored in the culling buffer.

One word of the segment control block defines a pointer to the data buffer which includes the segment's primitive data. The graphics primitive is defined in terms of the local model coordinate set of the segment.

The display list structure used by the graphics processor system 100 allows the "instantiation" of segments. That is, a single segment, once created, may be referenced any number of times by other segments in the display list structure. For example, a single segment defining a cube face might be invoked by each of the segments F-K of FIG. 2 rather than duplicating this information for each child of segment C. Each reference to the instanced segment can alter the attributes of the instanced segment since attributes may be inherited during traversal. Thus, each segment F-K would have a different transformation matrix to position the instantiated face in the correct location to form the cube 160.

In the illustrated embodiment, all quantities in the display list buffers (including control blocks) are stored in fixed length packets of either sixteen words or thirty-two words, wherein each word is thirty-two bits. These fixed length packets ease memory access, memory allocation, and memory deallocation tasks.

For a typical culling buffer or primitive data buffer packet, padding words are used to fill out the packet to sixteen or thirty-two words as necessary. Quantities that ordinarily would be longer than thirty-two words (such as many primitive data types) are broken up into sixteen word packets, and linked together via "next packet" pointers. A "last data buffer packet" pointer of the control block eliminates the need for traversing the entire linked list to find the last buffer packet in order to append segment data.

The above-described segments form a hierarchical display list which is created and stored in the DLM 116 by the terminal processor 112 in a conventional manner. The terminal processor 112 accesses the DLM 116 via the system bus 118. Once the display list has been stored in the DLM 116, the display list may be traversed and processed to produce the desired images of the stored object representations.

Geometry Processor Transformation Algorithms

The geometry processor 136 performs all matrix and vector operations, culling, clipping, projections, and screen scaling in projecting three-dimensional display list data into a two-dimensional screen space.

As noted above, the basic element in the display list memory is the segment, and each segment can optionally have a transformation matrix. This matrix takes data in the segment's coordinates set and transforms it into the parent's set. In FIG. 2, for example, segment D's transformation matrix, when applied to the data in segment D's data buffer, transforms it into segment B's coordinate set. Similarly, segment B's transformation matrix transforms its data into segment A's coordinate set. These transformations are accomplished by rotation, scaling, and translation components in each transformation matrix.

In the preferred embodiment of the present invention, scaling, rotation, and translation terms are stored in a 4×3 transformation matrix. The convention used in the matrix representation is as follows:

| m00 | m01 | m02 |
| m10 | m11 | m12 |
| m20 | m21 | m22 |
| m30 | m31 | m32 |

Points of a graphics primitive are represented by their X, Y, and Z coordinate values, plus a constant term, in the following representation:

point P=[Px Py Pz 1]

Multiplying a point by a transformation matrix gives as an output the point in the new coordinate set defined by the transformation matrix. For example, P'=P*M=[Qx Qy Qz], where:
Qx=Px*m00+Py*m10+Pz*m20+m30
Qy=Px*m01+Py*m11+Pz*m21+m31
Qz=Px*m02+Py*m12+Pz*m22+m32

Rotation about any of the three coordinate axes can be accomplished with the following matrices (where is the angle of rotation):

| X axis rotation: | | |
| 1 | 0 | 0 |
| 0 | cosθ | −sinθ |

-continued

|       | sinθ | cosθ |
|-------|------|------|
| 0     | 0    | 0    |

Y axis rotation:

| cosθ  | 0    | sinθ |
|-------|------|------|
| 0     | 1    | 0    |
| −sinθ | 0    | cosθ |
| 0     | 0    | 0    |

Z axis rotation:

| cosθ | −sinθ | 0 |
|------|-------|---|
| sinθ | cosθ  | 0 |
| 0    | 0     | 1 |
| 0    | 0     | 0 |

Scaling about any of the three coordinate axes can be done by incorporating the desired scaling terms (denoted by "S") into the following matrix:

| Sx | 0  | 0  |
|----|----|----|
| 0  | Sy | 0  |
| 0  | 0  | Sz |
| 0  | 0  | 0  |

Translation can be accomplished by setting desired translation terms (denoted by "T") into the following matrix:

| 1  | 0  | 0  |
|----|----|----|
| 0  | 1  | 0  |
| 0  | 0  | 1  |
| Ty | Ty | Tz |

As noted above, the highest level segment in the tree-structure hierarchy of the present invention is the viewport definition segment. The coordinate set for the viewport definition segment is called the world coordinate set. It is in the world coordinate set that the eye point 156 and sight point 158 values are specified. The specification of an eye point and sight point, as well as a roll angle θ, define the eye coordinate set.

The eye-scaled coordinate set is introduced to simplify the clipping process. In the eye coordinate set, the equations for the clipping planes are as follows:

| Right plane:  | X' = Z * tan(X angle)  |
| Left plane:   | X' = −Z * tan(X angle) |
| Top plane:    | Y' = Z * tan(Y angle)  |
| Bottom plane: | Y' = −Z * tan(Y angle) |
| Near plane:   | Z' = near [a constant] |
| Far plane:    | Z' = far [a constant]  |

By simply scaling the X and Y points by their respective cotangent terms, the clipping tests are greatly simplified. Specifically, if:

X'=X * cot(X angle), and

Y'=Y * cot(Y angle), then the equations for the six clipping planes become:

| Right plane:  | X" = Z    |
| Left plane:   | Y" = −Z   |
| Top plane:    | Y" = Z    |
| Bottom plane: | Y" = −Z   |
| Near plane:   | Z" = near |
| Far plane:    | Z" = far  |

With scaling done in the above manner, to test whether any point of a bounding box is inside or outside of a clipping plane involves a simple comparison test of two numeric values. The resultant coordinate set obtained by scaling the X and Y coordinates is termed the eye-scaled coordinate set. The scaling terms are conveniently stored in a transformation matrix which is stored in a viewport packet in the viewport definition segment.

For perspective projection, the transformation matrix is as follows:

| cot(X angle) | 0            | 0  |
|--------------|--------------|----|
| 0            | cot(Y angle) | 0  |
| 0            | 0            | −1 |
| 0            | 0            | 0  |

For parallel (orthographic) projection, the user explicitly defines a matrix that sets the six clipping planes. The parallel projection transformation matrix is as follows (with R=right, L=left, T=top, and B=bottom):

| 2/(R − L)       | 0               | 0  |
|-----------------|-----------------|----|
| 0               | 2/(T − B)       | 0  |
| 0               | 0               | −1 |
| −(R + L)/(R − L)| −(T + B)/(T − B)| 0  |

With these matrices and the defined clipping planes, all points are scaled and translated to fit into the defined viewing volume.

Hardware Organization

Figure 4:
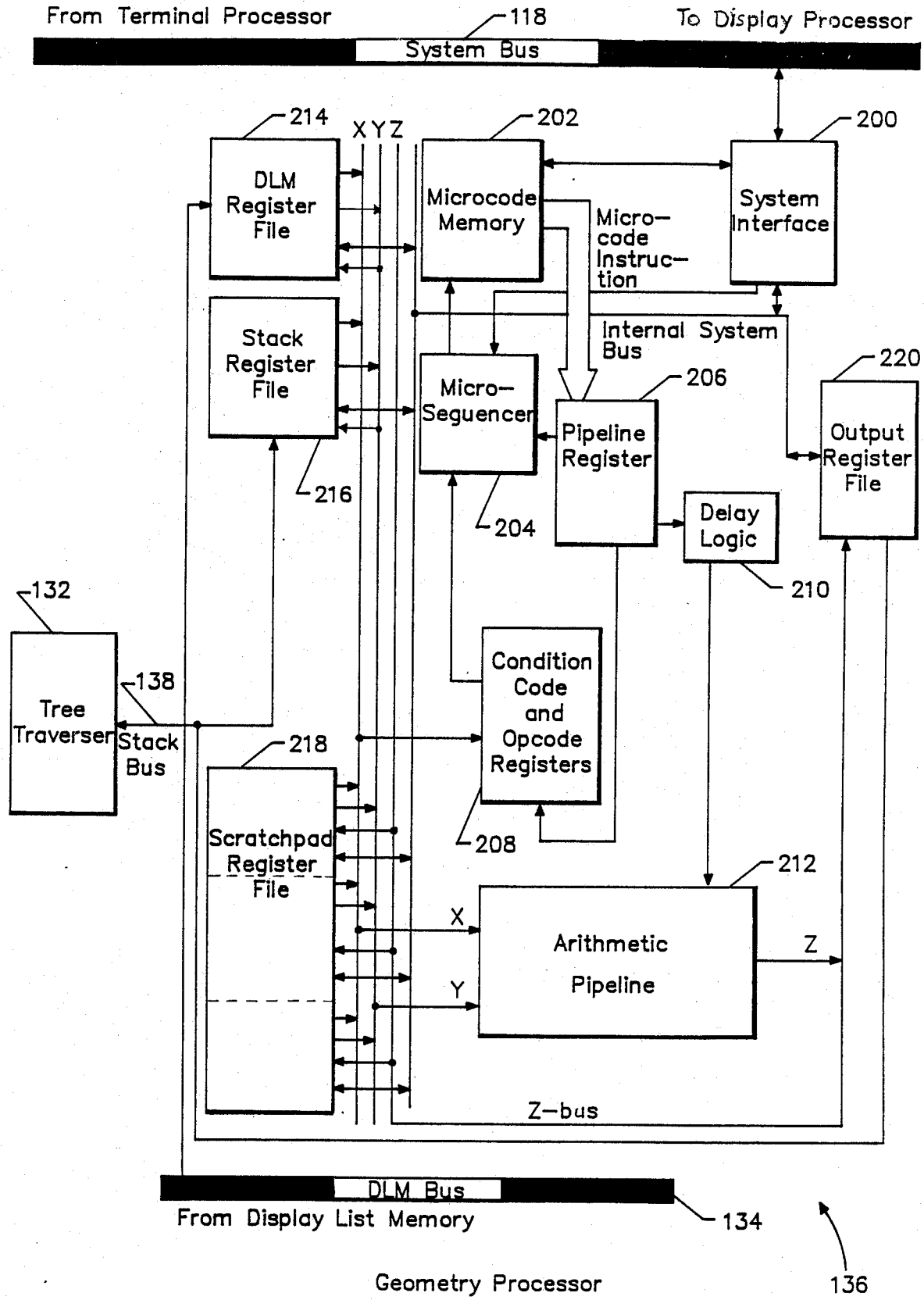
FIG. 4 is a schematic diagram of the overall geometry processor circuitry.

FIG. 4 shows the geometry processor 136 as a combination of multiport double-buffered register files and an arithmetic pipeline interconnected by internal buses and controlled by a microsequencer with peripheral control elements.

The system interface 200 couples the geometry processor 136 to the system bus 118. The system interface 200 responds to commands from the terminal processor 112 (shown in FIG. 1) to address all registers and status flags in the geometry processor 136 by selecting the appropriate read or write address. The system interface 200 is also used by the terminal processor 112 to download microcode instructions from the host to a microcode memory 202 at initialization of the geometry processor 136. A microsequencer 204 uses its address outputs to select a microcode instruction from the microcode memory 202. The selected microcode instruction is temporarily stored in a pipeline register 206.

A portion of the microcode instruction from the pipeline register 206 is coupled back to the branch address inputs and instruction inputs of the microsequencer 204 to control further microsequencer operation. Other bits of the microcode instruction stored in the pipeline register 206 are routed to condition code and opcode registers 208 and to a delay logic circuit 210. The delay logic 210 forwards control instructions to an arithmetic pipeline 212 after a selectable time delay. The arithmetic pipeline 212 performs sequential calculations. An X bus and a Y bus bring data into the arithmetic pipeline 212, and a Z bus conveys results from the arithmetic pipeline 212 to a destination register indicated by the active microcode instruction.

Four multiport register files are connected to the X, Y, and Z buses. The DLM register file 214 stores data packets that are received from the DLM 116 through the DLM bus 134 under the control of the tree traverser 132. A stack register file 216 stores data received over the stack bus 138 from the tree traverser 132. A scratch pad register file 218 (which may consist of one or more register subfiles) stores intermediate results during serial calculations. An output register file 220 stores the final results of arithmetic pipeline calculations. The contents of the output register file 220 may be placed directly onto the stack bus 138, or may be sent to the terminal processor 112 and/or display processor 140 through the system interface 200 and the system bus 118.

The geometry processor 136 is coupled to the tree traverser 132 by means of the bidirectional stack bus 138. The geometry processor 136 is coupled to the DLM bus 134 for input purposes only from the DLM 116. In order to conserve input/output signal lines to the geometry processor 136, the DLM bus 134 and the stack bus 138 are 16-bit time-multiplexed busses in the illustrated embodiment. During the first half of a bus transfer, the sixteen most significant bits of a data word are present on a bus, and during the second half of the bus transfer, the sixteen least significant bits of the data word are present on the bus.

The stack bus 138 communicates with the stack register file 216, and the output register file 220, writing data into the stack register file 216, and reading data out of the output register file 220.

The DLM bus 134 transfers addresses and data from a single source, the DLM 116, and in only one direction, that is, to the tree traverser 132 and geometry processor 136. Consequently, the DLM bus 134 has no bus arbitration or handshake delay and therefore can accommodate extremely high data transfer rates. In the illustrated embodiment, the DLM bus 134 can transfer 40 megabytes of data per second, as compared to 6 megabytes per second for the system bus 118.

The system bus 118 communicates with all registers and the microcode memory 202 in the geometry processor 136. The system bus 118 is capable of functionally replacing the operation of the DLM bus 134 and/or the stack bus 138. This enables the geometry processor 136 to operate, and be tested, using only the system bus 118.

The DLM register file 214 is a double-buffered memory, meaning that it is divided into two halves While the geometry processor 136 is operating on data in one-half of the DLM register file 214, data is being written into the other half from the DLM bus 134. When the geometry processor 136 is finished with the data in the first side, and the DLM bus 134 is finished transferring data to the second side, the two sides are swapped. Double buffering allows the DLM bus 134 to transfer data while the geometry processor 136 operates on internal data. The stack register file 216 and the output register file 220 are also double-buffered In order for a bus transfer to take place, the status of the register file with which the bus will communicate must be known. When the geometry processor 136 is finished processing data in one-half of a register file, that half of the register file will be allocated to the bus. Each of the input and output register files 214, 216, and 220 have associated with them a Memory Available flag, which indicates when the associated register file is available for input. Each register file also has associated with it a Memory Loaded flag, which indicates when a bus transfer into the register file is complete. Thus, use of the Memory Available and Memory Loaded flags in a handshake manner permits control of the flow of data into and out of each double-buffered register file. The geometry processor 136 also has three interrupt signals (one each for the tree traverser 132, the display processor 140, and the terminal processor 112), which are used to signal other processors that data is ready to be transferred from the output register file interrupted to the other processor. The geometry processor 136 also generates an Object Visible signal, which is coupled to the display processor 140.

Figure 5:
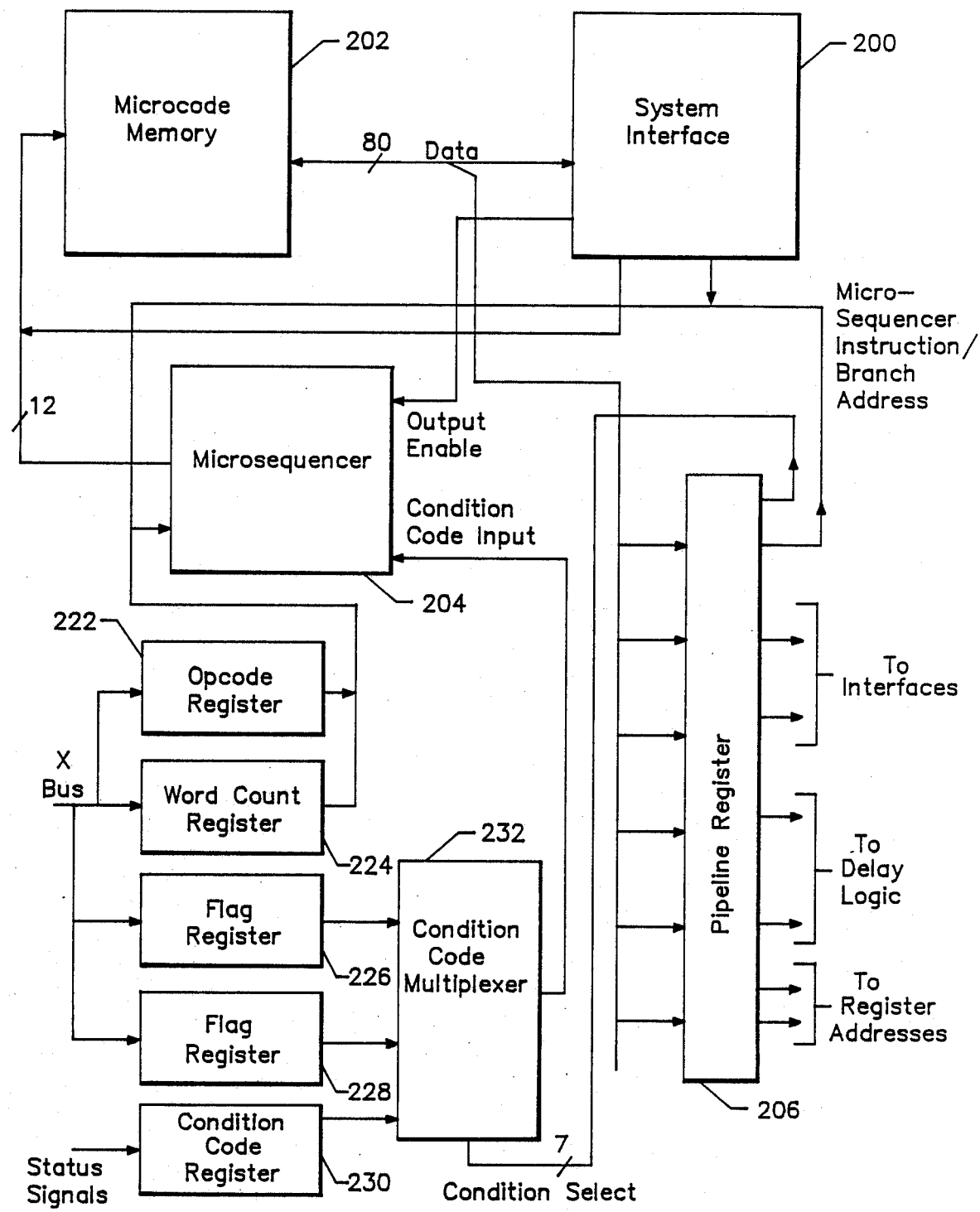
FIG. 5 is a schematic diagram of the internal control circuitry for the geometry processor.

Referring now to FIG. 5, the geometry processor is controlled by the microsequencer 204 in conjunction with various peripheral devices. In the illustrated embodiment of the invention, the microsequencer 204 is an Integrated Device Technology microsequencer part number IDT39C10B.

On system start-up, the host computer downloads microcode instructions through the system bus interface 200 into the microcode memory 202, which in the illustrated embodiment is a 4,096×80 bit memory. When a command is received over the system interface 200 by the microsequencer 204, the appropriate microcode instruction is fetched from the microcode memory 202 and placed in the 80-bit pipeline register 206 so that different fields of the microcode instruction can be sent to different devices within the geometry processor at the same time. The microsequencer 204 receives a 4-bit microsequencer instruction from the microcode instruction and executes it, using a branch address supplied from the pipeline register 206. During instruction execution, the microsequencer 204 gets status information by examining bits in one of several flag and condition code registers (226, 228, and 230) by means of a condition code multiplexor 232. An opcode register 222 and a word count register 224 store controlwords from a segment during the processing of graphics data.

From the pipeline register 206, a field from the current microcode instruction may be routed to the geometry processor interface circuits, the arithmetic pipeline circuit 212, or the address inputs and read/write control logic of the various multiport register files 214, 216, 218, and 220, to control the flow of data through the geometry processor and the operations performed on that data.

Upon initialization, the geometry processor 136 is set such that its microprogram counter is set to zero, all Memory Available flags are set (indicating that the register files are available), and all Memory Loaded flags are reset (indicating that the register files are not loaded). The geometry processor 136 then waits for the DLM register file 214 to become loaded. The tree traverser 132 monitors the DLM Memory Available flag. When the DLM Memory Available flag indicates that the DLM register file 214 is available, the tree traverser 132 causes a control word, along with up to thirty-one data words, to be sent from the DLM 116 to the geometry processor 136 over the DLM bus 134. When the DLM register file 214 is fully loaded, the DLM Memory Loaded flag is set.

The sixteen most significant bits of the control word consists of flags. The next 8-bit field comprises an operation code, or "opcode", and the next 8-bit field is a word count. Upon receiving the DLM Memory Loaded flag, the microsequencer 204 will load the control word into the condition code and opcode registers 208. The opcode, loaded into the opcode register 222, will be used as a jump address which the mircosequencer 204 will use to branch to a particular microcode instruction routine stored in the microcode memory 202, thus determining the operations to be performed on the data loaded in the DLM register file 214. The microsequencer 204 uses the sixteen flag bits to make further decisions on how to operate on the data. The word count, loaded in the word count register 224, indicates to the microsequencer 204 how many words have been loaded into the DLM register file 214. While the microsequencer 204 is operating on data stored on one side of the DLM register file 214, the tree traverser 132 may load a new set of data into the other side of the DLM register file 214. When the microsequencer 204 is finished with its current task, its side of the DLM register file 214 is designated as available by means of the DLM Memory Available flag. The geometry processor 136 then checks to see if a new task has been loaded into the other side of the DLM register file 214; if so, the new task is performed.

A similar operation occurs with respect to data stored in the stack register file 216, which is passed to the geometry processor 136 directly by the tree traverser 132 over the stack bus 138. Similarly, the output register file 220 double buffers the data generated by the geometry processor 136 and passes processed data along either to the tree traverser 132 over the stack bus 138, or to an external processor over the system bus 118.

The condition code and opcode registers 208 contain two registers that store control flags from data packets written into the DLM register file 214 during tree traversal. One of the flag registers 226 contain flags considered to be local to each segment in the tree. The other flag register 228 stores viewport-related global flags. The local and global flags control conditional processing as different type of objects are encountered during tree traversal.

In addition to the flag registers 226, 228, various independent flags signals are coupled to a condition code register 230. These independent flag signals include the DLM register file Memory Loaded signal, activated by the tree traverser 132 when the DLM register file 214 contains valid data, and the output register file Memory Available signal, activated by the tree traverser 132 when data has been read from the output register file 220. An ALU Sign flag, an ALU Overflow flag, an ALU Compare result flag, and an ALU Object Visible flag are generated by the arithmetic pipeline 212, and permit the microsequencer 202 to branch conditionally based upon calculation results during graphics processing.

A flag or a condition code can be selected by a 40-bit condition code multiplexer 232 under control of condition select signals from the pipeline register 206.

The geometry processor's functional modules are interconnected by three major internal busses that communicate arithmetic data from module to module. These busses are the X bus, the Y bus, and the Z bus, all of which in the illustrated embodiment are 16-bit time-multiplexed busses, driven by the most significant sixteen bits of a 32-bit data word during the first half of a system clock cycle, and by the least significant sixteen bits during the second half of the clock cycle. All data routing by way of the X bus, Y bus, and Z bus is controlled by microcode instructions temporarily stored in the pipeline register 206.

The X bus has as its primary function the passing of input data to the A input of a multiplier in the arithmetic pipeline 212. The Y bus has as its primary function the coupling of data to the B input of the multiplier in the arithmetic pipeline 212.

The Z bus couples the outputs of the arithmetic pipeline 212 to the inputs of the output register file 220 or to the inputs of the scratch pad register file 218. The output register file 220 receives final calculation results, which may be coupled to the stack bus 138, or routed to the system bus 118 for transmission to the terminal processor 112 or the display processor 140. Results of an intermediate calculation may be stored in the scratch pad register file 218, and a subsequent microcode instruction can retrieve the intermediate results onto the X bus or the Y bus for use in further calculations.

Figure 6:
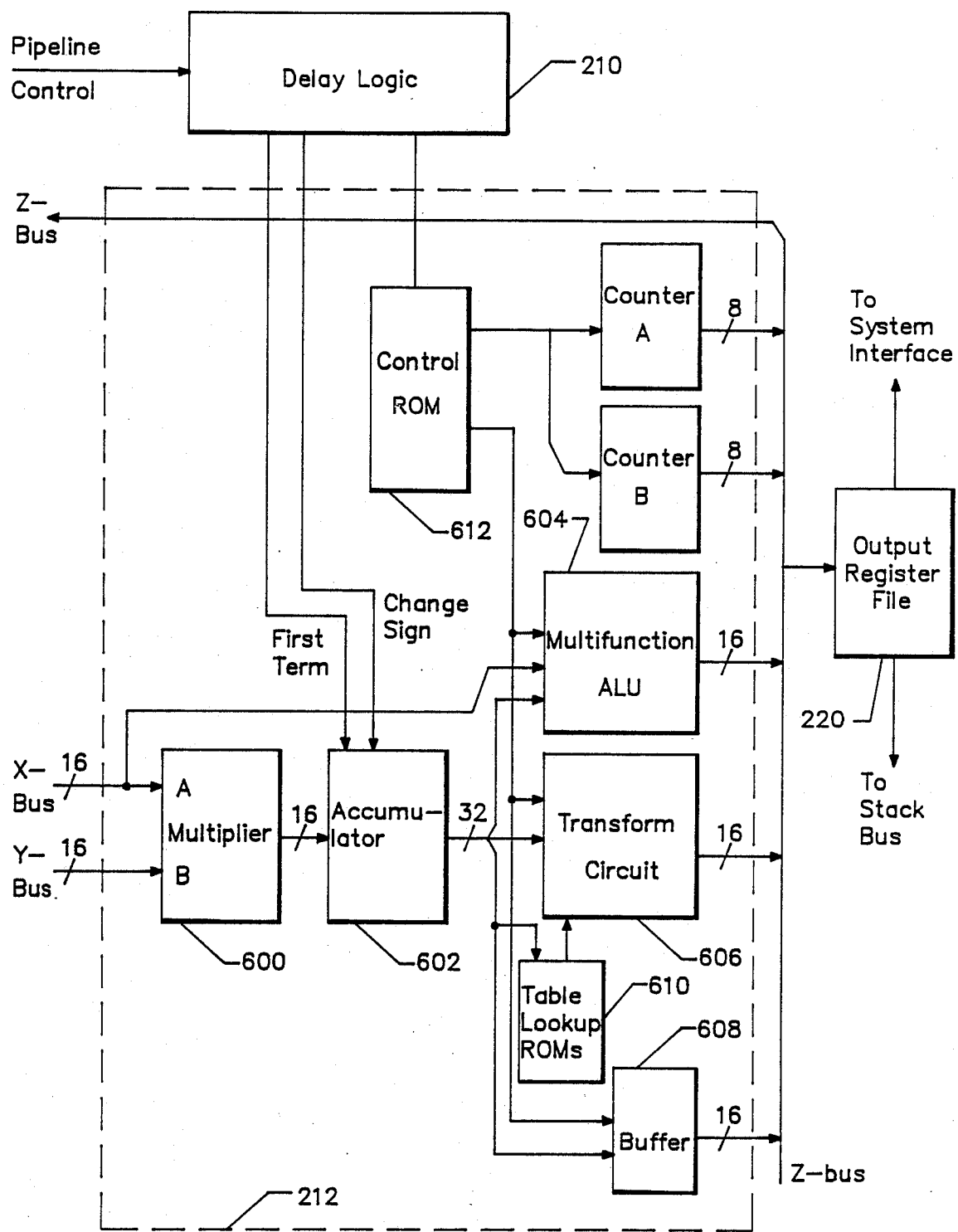
FIG. 6 is a schematic diagram of the internal arithmetic pipeline circuitry of the geometry processor.

FIG. 6 shows the circuitry of the arithmetic pipeline 212, which is used for all graphics-related calculations in the geometry processor. All data input into the arithmetic pipeline 212 is coupled to a 32-bit floating point multiplier 600, which may be, for example, the WTL 1032 multiplier circuit made by WEITEK Corporation. The multiplier 600 has two inputs, A and B, which are coupled respectively to the X bus and the Y bus.

The output of the multiplier 600 is connected directly to the input of an accumulator circuit 602. In typical use, the accumulator 602 accumulates the sum of all numbers presented to its inputs, and outputs the sum. The accumulator 602 has two control inputs, received through the delay logic 210 from the microcode instruction stored in the pipeline register 206. A First Term signal causes the accumulator to reset to zero before accumulating input numbers. A Change Sign signal causes the accumulator to subtract the input number from the accumulated sum by changing the sign of the input number before adding. The accumulator 602 is more fully described in the aforementioned pending application entitled "Floating Point Accumulator Circuit".

The output of the accumulator 602 is always the accumulated sum, including the most recent input number. The sum is valid after four clock cycles in the illustrated embodiment. The output of the accumulator 602 is coupled to the inputs of a multifunction ALU circuit 604, a transform circuit 606, a Z bus buffer circuit 608, and a set of table lookup read-only memory (ROM) circuits 610.

The multifunction ALU 604 can convert a 32-bit fixed point number to a 32-bit floating point number, and vice versa, or compare numbers of either type. The control inputs of the multifunction ALU circuit are driven by a control read-only memory (ROM) 612 that receives its addresses from the delay logic 210. The output of the multifunction ALU 604 is coupled to the Z bus when enabled by control signals from the control ROM 612. The specific functions of the multifunction ALU 604 are more fully set forth in the aforementioned pending application entitled "Multifunction Arithmetic Logic Unit Circuit".

The transform circuit 606 can compute the square root or the reciprocal of a 32-bit floating point number, and generate curves, using a piecewise linear approximation algorithm. The table lookup ROM's 610 are connected to the inputs of the transform circuit 606. The table lookup ROM's 610 are addressed by data from bits 11 through 22 of the accumulator 602 output. The input data addresses the table lookup ROM's 610, which retrieve a corresponding zero intercept number and slope number for the transformation, and transfer them to the transform circuit 606. With these two inputs and the remaining bits of the accumulator 602 output, the transform circuit 606 can complete the selected function. Signals from the control ROM 612 select the operational mode of the transform circuit 606. The transform circuit 606 is more fully described in the aforementioned pending application entitled "Linear Approximation Transform Circuit".

The control ROM 612 also controls the coupling of the multifunction ALU 604, the transform circuit 606, and the accumulator 602 to the Z bus. The control ROM 612 also controls two 8-bit counters, A and B, used for counting calculations and data elements. The two counters can be independently cleared, incremented, or coupled to the Z bus, as selected by specific control signals from the control ROM 612.

Figure 7:
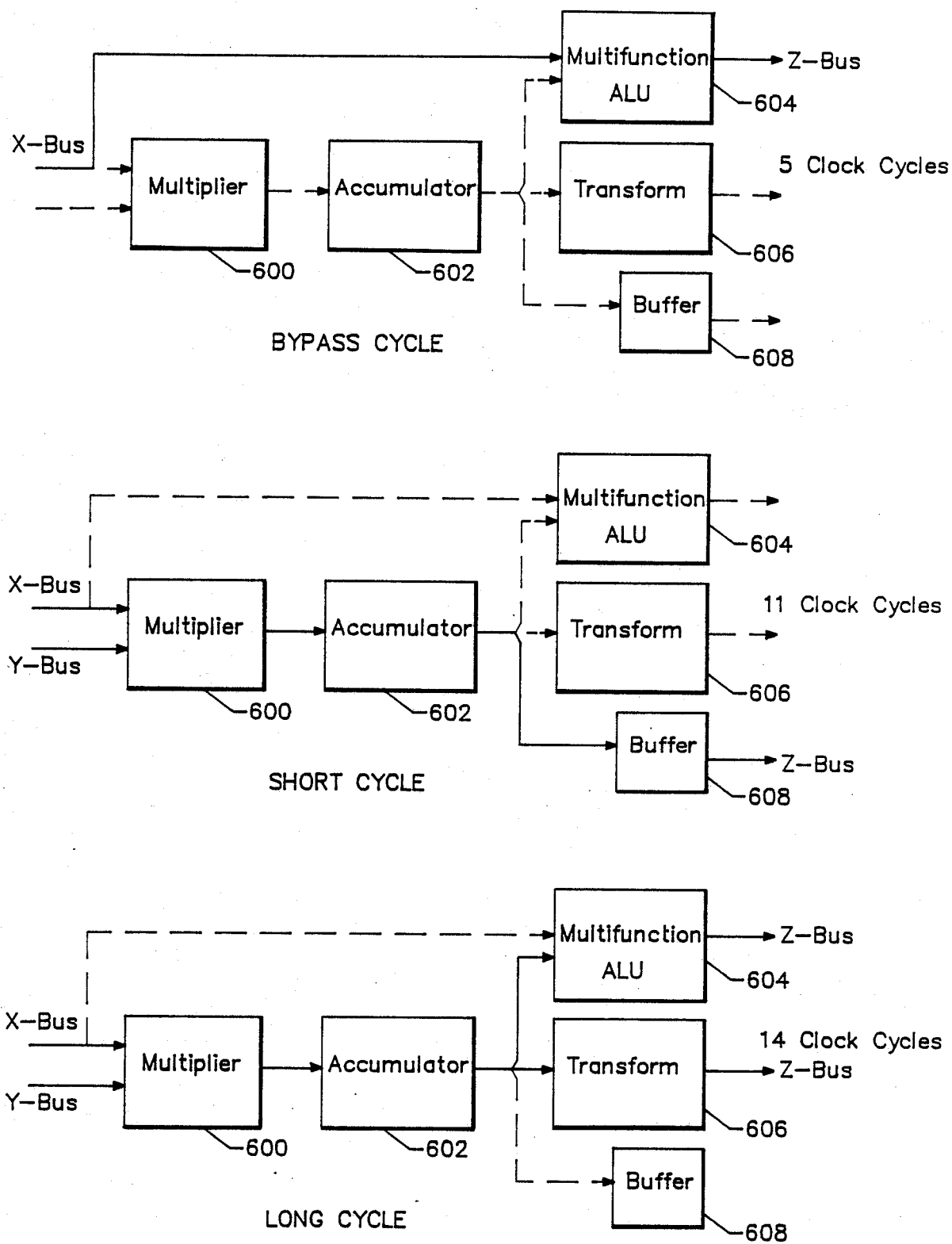
FIG. 7 is a block diagram of the possible data paths through the arithmetic pipeline circuitry of the geometry processor.

The arithmetic pipeline 212 can perform compound calculations, with data flowing through one of three paths during any one calculation. The three possible data paths through the arithmetic pipeline 212 are shown in FIG. 7.

In the Bypass Cycle, data is routed only to the multifunction ALU 604, and is not passed through the multiplier 600 or the accumulator 602. Five clock cycles are required for a Bypass Cycle in the illustrated embodiment.

The Short Cycle is used when numbers must be multiplied and/or accumulated, but need no further processing, and may be coupled directly from the accumulator 602 output to the buffer 608, for coupling to the Z bus. The Short Cycle requires eleven clock cycles in the illustrated embodiment.

The Long Cycle is the default mode, and requires fourteen clock cycles in the illustrated embodiment. In the Long Cycle, data passes through the multiplier 600, then the accumulator 602, and then through either the multifunction ALU 604 or the transform circuit 606.

Because the circuitry that makes up the arithmetic pipeline 212 requires a different number of clock cycles to operate :,n each mode, a delay logic circuit 210 is provided between the pipeline register 206 and the arithmetic pipeline 212 to delay the execution of microcode instructions until valid data is present at the inputs of the arithmetic pipeline 212.

Figure 8A:
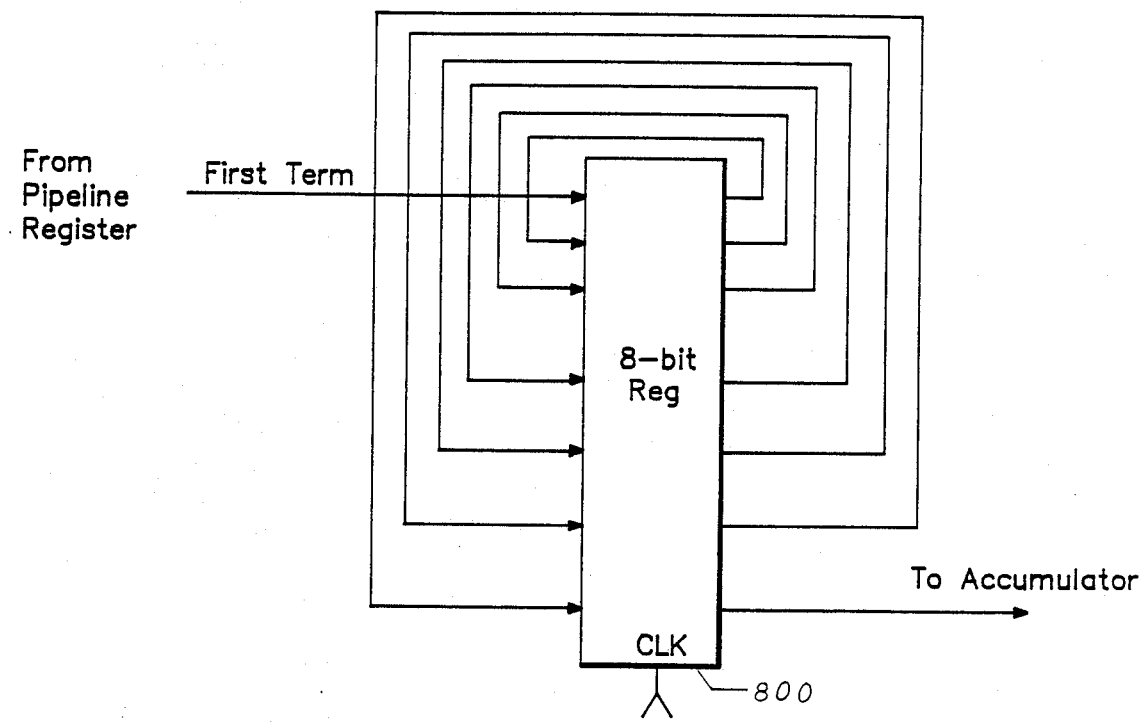
FIGS. 8a and 8b are schematic diagrams of the delay logic circuits of the geometry processor.
Figure 8B:
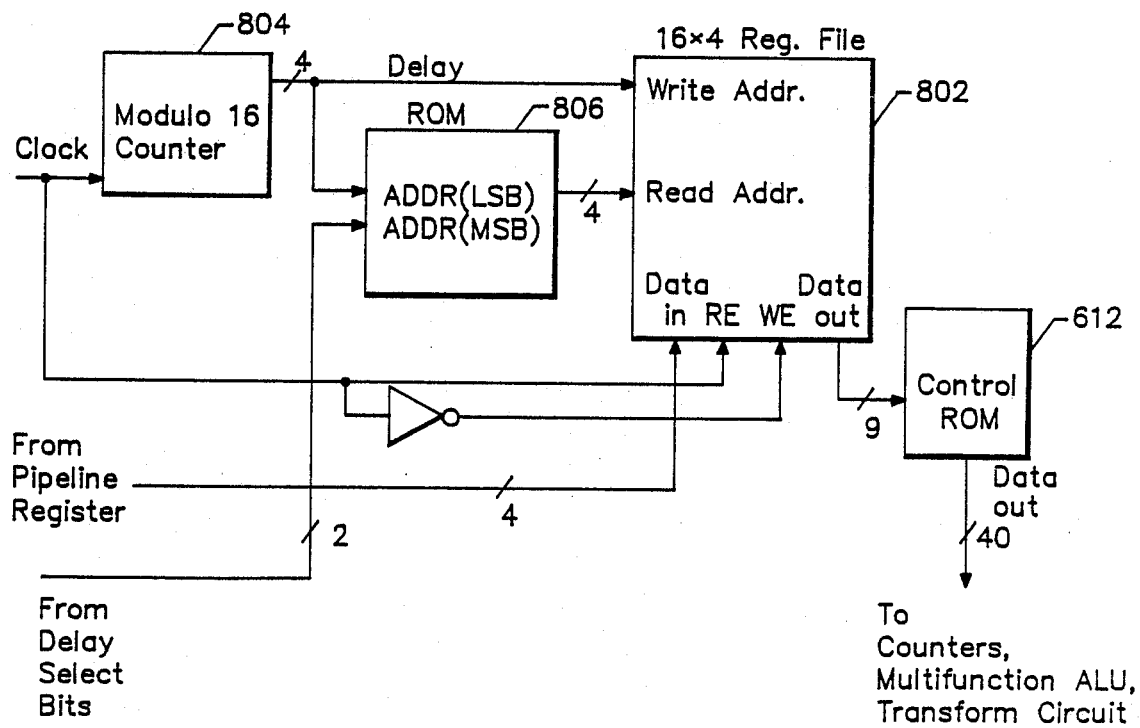

FIGS. 8a and 8b depicts the organization of the delay logic 210 for the arithmetic pipeline. For certain signals, such as the First Term and Change Sign signals, clocked registers are used to implement the delay, which is always a specific number of clock cycles. For example, the control signals for the accumulator 602 are always delayed seven clock cycles to allow for two clock cycles required for data access from the source register file and five clock cycles required for a multiplier 600 calculation. As shown in FIG. 8a, the First Term signal is simply coupled to a clocked 8-bit register 800 and fed back to the same register six times, resulting in a seven clock cycle delay. The same type of circuit is used for the Change Sign signal.

FIG. 8b shows a simplified view of the delay logic circuit that delays microcode instructions for the multifunction ALU 604 and the transform circuit 606. The delay is implemented by temporarily storing the control bits of each microcode instruction in a 16×4 register file 802 that is continually addressed by offset read and write addresses. A modulo-16 counter 804 is continually incremented by the system clock and generates a 4-bit address that is coupled to the register file's write address inputs, and to the least significant address bits of a delay ROM 806. The delay ROM 806 contains a set of 4-bit addresses offset from their memory locations by an offset equal to the desired delay in clock cycles. For example, if a 5-cycle delay is required, the data word in the delay ROM 806 at address "2" will contain the hexadecimal value of "7". The most significant two bits of the delay ROM 806 address inputs are coupled to a Delay Select signal from the pipeline register 206, so that different delays can be selected by selecting different address areas in the delay ROM 806.

The output data lines from the delay ROM 806 are coupled to the register file's read address inputs. The register file's read enable and write enable inputs are alternately driven by the clock signal and its inverse. A control ROM address, which embodies a command to the arithmetic pipeline 212, is input into the register file 802 from the pipeline register 206. The register file's output remains irrelevant until the correct number of clock cycles has passed, at which point the read address of the register file 802 will have the same value as the write address when the control ROM address was originally stored.

The output of the register file 802 (i.e., the proper control ROM address) is coupled to the address inputs of the control ROM 612, which retrieves the specific combination of individual control signals stored at the input address. The output of the control ROM 612 is a combination of read and write control signals, scale values, mode selection signals for the multifunction ALU 604 and the transform circuit 606, and counter function selection signals.

The write enable signals for the Z bus are delayed a variable number of cycles (always 5, 11, or 14 cycles in the illustrated embodiment) by delaying the signals through three sets of registers in a manner similar to that shown in FIG. 8a. The three sets of delay register outputs are coupled to a multiplexer (not shown) controlled by the Delay Select bits of the current microcode instruction from the pipeline register 206.

By use of the delay logic, a single microcode instruction that initiates an arithmetic pipeline calculation can also control the entire arithmetic pipeline cycle.

During the course of a typical arithmetic operation, data is passed to the arithmetic pipeline 212 from the DLM register file 214 or the stack register file 216 in the order in which they occur. During processing, the data is passed through the arithmetic pipeline 212 under the control of the microsequencer 204 an the delay logic circuit 210, which permits the entire arithmetic pipeline to function as a self-controlled module and to perform a complete compound calculation without further microsequencer 204 intervention.

To begin the processing of data, the geometry processor microsequencer 204 simultaneously causes an arithmetic pipeline microcode instruction to be sent to the delay logic 210, and causes th data to be processed to be transferred onto the X bus and/or the Y bus to begin a calculation. In the Long Cycle or the Bypass Cycle, the delay logic 210 releases control signals to the accumulator 602 after seven clock cycles, so that data is present at the accumulator's inputs at the same time that the control signals are given to the accumulator 602.

In the Long Cycle or the Short Cycle, the delay logic 210 releases control signals to the multifunction ALU 604, the transform circuit 606, the Z-bus buffer 608, and counter A or counter B after the required number of clock cycles (which varies with the functions performed), so that the data to be operated on is present at the inputs of these devices at the same time that the control signals are present at the inputs of these devices.

In any of these processing cycles, the results produced by the arithmetic pipeline 212 become valid on the Z bus after the final total number of clock cycles required for the entire arithmetic cycle. The delay logic 210 releases a combination of a register file destination address and an appropriate write enable signal at the same time that processed data is present on the Z bus. Thus, a single microcode instruction can control the entire data path through the arithmetic pipeline, specify the arithmetic function to be performed on that data, and specify the destination for the results of the calculation.

The Traversal Process

The traversal process involves the sequence of operations that takes data from the DLM tree structure, processes it, and displays it on the view screen. The two basic subprocesses involved in traversal that are performed by the geometry processor are the culling process and face processing.

Culling means filtering out invisible graphics objects and storing visible graphics objects on a stack memory within the tree traverser circuit. Face processing means popping the graphics objects off of the tree traverser stack memory and converting the data for each object from three-dimensional to two-dimensional scaled coordinates. These processes are described in further detail below.

1. The Culling Process

The culling process determines whether or not an object is visible in a scene. By performing a simple test on the bounding box enclosing a segment, the geometry processor can determine if the bounding box is completely outside the defined viewing volume (in which case the segment is culled out and not processed further), or completely inside the viewing volume (no clipping needs to be done), or intersects one or more clipping planes (in which case clipping needs to be performed).

Culling can also be done on a projected minimum bounding box size. If the projected screen size of a segment's bounding box is smaller than some defined number of pixels, then it can be culled out.

When a segment is culled, that segment and all of its children segments are removed from further processing. This greatly improves the geometry processor efficiency in scenes where large numbers of graphics objects are outside the viewing volume.

The culling process, in brief, starts with the root segment in the display list memory 116, which is the viewport definition segment (i.e., the first segment contains a packet in its culling buffer which defines the current viewport parameters). Viewport information includes projection terms (perspective field of view, orthographic projection size, near and far clipping planes, etc.), screen scaling terms (which set the size of the final image on the display screen), and flag bits. The projection terms are stored in a standard 4×3 transformation matrix.

To initiate the traversal and face processing of the data base stored in the DLM 116, the terminal processor 112 sends a "Start Traverse" instruction to the tree traverser 132, which specifies the starting address of the viewport definition segment of the display list tree. The tree traverser 132 traverses the display list in the DLM 116, addressing the linked segments in sequence in accordance with a sibling preferred traversal algorithm, and coordinates the sending of the culling buffer packets to the geometry processor 136 over the DLM bus 134.

The first packet of the culling buffer sent to the geometry processor contains the segment attributes. Those segment attributes which are not locally defined in the segment attribute packet may be "inherited" by obtaining the segment attributes from the parent segments' attributes, which have been previously stored in the stack register file 216. The geometry processor 136 stores a set of attributes (either locally defined or inherited) in the output register file 220 for later transfer to the tree traverser 132 over the stack bus 138 if the segment is determined to be visible during the culling processing of the segment. Referring to FIG. 2, since the viewport definition segment A does not have a parent segment, all attributes stored in the output register file 220 for segment A are locally defined in the attribute packet of the segment A culling buffer.

The culling buffer of each segment also usually has a transformation matrix packet. The transformation packet contains a local transformation matrix which transforms the segment data from the local coordinate set into the coordinate set of the parent segment. In the case of the viewport definition segment, the local transformation matrix transforms the world coordinate set to the eye coordinate set on the defined viewport.

The geometry processor 136 performs a matrix concatenation, which multiplies the local transformation matrix by the previously concatenated transformation matrix of the parent segment. The resulting concatenated transformation matrix is the "Current Transformation Matrix" that transforms the graphics data of the segment into the coordinate set of the viewport definition segment. The Current Transformation Matrix is stored in the output register file 220 for transfer to the tree traverser 132 if the graphics primitive of the segment is determined to be visible.

When the viewport packet from the viewpoint definition segment is received by the geometry processor 136, the geometry processor stores the viewport scaling matrix in the stack register file 216 and stores the screen scaling terms and flag bits in the DLM register file 214. In addition, the viewport packet is transmitted to the display processor 140 over the system bus 118.

An additional packet present only in the viewport segment is the "light source" packet. A light source, defined in terms of the world coordinate set, is rotated into the eye-scaled coordinate set by multiplying the light source coordinates by the Current Transformation Matrix stored in the output register file 220, and the results are saved.

The last culling buffer packet sent to the geometry processor 136 by the tree traverser 132 for each segment is the bounding box packet. When received, the geometry processor 136 commences a visibility test if the bounding box of the parent segment was not totally visible. As previously mentioned, the bounding box of a segment completely encloses the graphics primitive of the segment and all child segments of the segment. The use of such a bounding box greatly simplifies the visibility test.

To perform the visibility test, the geometry processor passes the segments' bounding box coordinates through the arithmetic pipeline 212. The multifunction ALU 604 compares the bounding box coordinates with the viewport coordinates stored in the geometry processor's scratchpad register files 218, and determines whether the segment is visible, invisible, or partially visible.

To test for a minimum size of a bounding box, the size of the bounding box is approximated by taking the diameter of the box, defined as to the distance between the first two corner points, and approximating the distance of the bounding box from the defined eye-point by averaging the depth values of the two corner points. For perspective projection, the diameter is divided by the distance to obtain an approximation of the size of the bounding box. For orthographic projection, the size of the bounding box is considered to be simply the computed diameter. If the size of the bounding box is determined to be smaller than a specified input value, the segment is considered to be not visible.

If the volume defined by the bounding box is determined to be within the field of view defined by the viewport definition packet, and the size of the bounding box is determined to be within a user-defined interval (i.e., the object is not too large or too small), the geometry processor 136 activates an Object Visible signal line to the tree traverser 132, indicating that the object within the bounding box is potentially visible. Since the segment bounding box encloses the graphics primitives of the current segment's child segments, the visibility test need not be repeated for the child segments of a segment for which the segment bounding box is determined to be wholly visible. If, on the other hand, the bounding box is entirely outside the field of view or the size of the box is not within the defined interval, the Object Visible signal line is reset. This latter "invisible" segment and all its child segments need not be further processed.

While the geometry processor 136 is processing the culling packets, the tree traverser 132 stores the child pointer, primitive data buffer pointer, and a "tree level" indicator of the segment control block in the tree traverser's internal stack memory. The tree level is the level of the segment within the hierarchical structure. Thus, for example, sibling segments have the same tree level.

If the segment object is determined to be visible by the geometry processor 136, the tree traverser 132 copies the flag word, concatenated transformation matrix, and the attributes of the object from the output register file 220 to its stack memory over the stack bus 138. If the object of the segment being culled is determined to be invisible, the tree traverser 132 supplies a Memory Loaded signal to the geometry processor 136 without transferring the data, to avoid a transfer of useless data. Thus, the attributes for invisible objects are not stored on the tree traverser stack memory. Since the attributes for invisible objects are not stored on the stack memory, those segments are not further processed. As will be discussed in greater detail below, the data which is stored on the stack memory for each segment determined to have visible objects will be subsequently re-transferred back to the geometry processor 136 over the stack bus 138 as the associated graphics primitives are transferred from the DLM 116 to the geometry processor 136.

After the culling buffer of a segment has been processed, the tree traverser 132 proceeds to another segment of the display list. In the illustrated embodiment, the tree traverser 132 uses a sibling-preferred method in which the tree traverser will process the sibling of a segment before processing the child of the segment. If a segment has no siblings, the tree traverser will then process the first child of the segment. For example, referring to FIG. 2, the viewpoint definition segment A does not have any sibling segments. Accordingly, after the segment A culling buffer data has been processed, the tree traverser 132 will traverse to the first child segment, segment B. After transmitting the segment B culling buffer packets to the geometry processor 136 for processing, the tree traverser 132 will proceed to the sibling segment, segment C, and will commence to forward the culling buffer packets of segment C to the geometry processor 136. Segment C has no additional sibling segments, therefore the tree traverser 132 will proceed to the first child segment, segment F, if the parent segment C bounding box containing the cube 152 is determined to be visible. The tree traverser 132 will continue traversing in this manner, sending the culling buffer packets of the sibling segments F-K in order to the geometry processor 136 for processing.

If a segment does not have any further sibling segments, and does not have a child segment (or the segment bounding box is invisible), the tree traverser 132 will begin to retraverse the culled segments and hence commence the face processing mode. For example, all the sibling segments of segment K have been traversed once the tree traverser 132 reaches segment K. Since segment K does not have a child segment, the culling mode terminates at segment K. If face 6 (the graphic primitive of segment K) is determined to be visible, the tree traverser 132 transfers the Current Transformation Matrix and attribute data for face 6 from the output register file 220 to the stack register file 216, and in addition begins transferring the graphics primitive packets of the segment via the DLM bus 134 to the geometry processor 136 for face processing.

2. Face Processing

The primitive data packets, like the culling buffer packets, are linked by pointers. Each primitive data packet is copied from the DLM 116 via the DLM bus 134 into the DLM register file 214 of the geometry processor 136. The tree traverser 132 uses the pointer address of each primitive data packet to obtain the next packet in the stream. A null pointer indicates that the present primitive data packet is the last packet in the data stream.

The geometry processor 136 interprets the opcode of each primitive data packet and selects the appropriate primitive packet face processing algorithm (as described in greater detail below). The face processing algorithms implemented by the geometry processor 136 of the illustrated embodiment transform vertices (and vertex normals, if shaded) to screen coordinates, discard a polygon if the polygon is determined to be facing away from the viewer, and clips each visible polygon to the field of view boundaries (clipping planes) if necessary. In addition, the geometry processor 136 projects the vertices by either a perspective or parallel method into a two-dimensional image plane and scales the vertices to the defined viewport. Face processing is performed by the geometry processor 136 on an edge by edge basis, and the data for each edge when completed is transferred to the display processor 140 over the system bus 118 in an edge packet format After a packet is face processed, the geometry processor 136 signals the tree traverser 132 that it is able to accept the next primitive data packet by activating a Memory Available signal line.

Once the geometry processor 136 indicates that it is ready for face processing of the next segment, the tree traverser 132 pops the attribute and transformation matrix data for the next visible segment J off the top of the stack memory and transfers this data via the stack bus 138 to the stack register file 216 of the geometry processor 136. The tree traverser 132 uses the stored primitive data buffer pointer from the stack memory to address and transmit the primitive data packets for segment J from the DLM 116 over the DLM bus 134 to the geometry processor 136 for face processing.

The tree traverser 132, during the retraversal of the display list, will continue backtracking over the "visible" segments, popping the data buffer pointers, transform matrices, and attributes off the stack memory and sending the corresponding primitive data packets and stack data to the geometry processor 136 for face processing, until a segment having an "untraversed" child segment is encountered. As previously mentioned, under the sibling-preferred traversal algorithm, the tree traverser 132 does not examine (and hence, traverse) a child pointer of a segment if the segment has a sibling pointer. Accordingly, if during retraversal the next segment-in-line to be retraversed has a child segment, and the segment presently being retraversed is the sibling segment of the segment next-in-line to be retraversed, the child segment was not traversed in the prior culling traversal. Once an untraversed child segment is encountered, the tree traverser 132 switches back to the culling mode, traversing the display list starting at the untraversed child segment.

For example, referring to FIG. 2, the tree traverser 132 after culling segment B traverses to the sibling segment C rather than to the child segment D during the initial traversal. During retraversal, the culled segments are face processed until the retraversal returns the tree traverser to segment C. Face processing is terminated after segment C, since the next segment-in-line to be retraversed, segment B, has an untraversed child segment, segment D. The tree traverser 132 then switches back to the culling mode, traversing and culling starting at segment D.

An untraversed child segment is detected by an examination of the tree level indicator of the current segment being retraversed, and the tree level indicator of the next segment on the stack (i.e., the next segment-in-line to be retraversed). If both tree levels are the same (i.e., the segments are siblings), and the next segment on the stack has a valid child pointer, then that child segment was not traversed.

The tree traverser 132 will continue traversing and retraversing the display list until each segment has been either culled out or face processed. The last primitive data packet of the viewport definition segment contains an "End-of-Traverse" primitive. The tree traverser sends the primitive data packets for the viewport segment to the geometry processor last. Thus, the End-of-Traverse primitive will be the last packet transferred to the geometry processor 136. The geometry processor 136 in turn sends the End-of-Traverse primitive unaltered to the display processor 140 over the system bus 118. The display processor 140 will then begin screen processing and will issue an interrupt to the terminal processor 112.

3. Face Processing Algorithms

As noted above, processing of segments continues during the culling process until terminated by the tree traverser 132. At that point in time, the segments that have not been culled are returned by the tree traverser to the geometry processor for data primitive processing. In this phase, the first packet sent to the geometry processor 136 for each segment is the Matrix Invert packet which is stored in the DLM register file 214. The geometry processor examines the Matrix Invert packet to determine whether the data base contains polygons that have reverse sides to be discarded or a light source that will create shading. If either is true, an inverted transformation matrix is calculated in the arithmetic pipeline 212 and stored in the scratchpad register file 218. Reception of the Matrix Invert packet also indicates to the geometry processor 136 that face processing has begun and that the geometry processor must have a new culled packet in its stack register file 216. The geometry processor 136 determines that it has received the new culled packet from the tree traverser 132 by the use of handshake signals on the stack bus 138.

Once the geometry processor has received a new culled packet, and the packet is loaded into the stack register file 216, the geometry processor sends the segment definition packet to the display processor 140. This packet defines the colors, fonts, and enable bits for all data items in the segment.

The Matrix Invert packet also contains two flag bits, the Invert bit and the Rotate Light bit. If the Invert bit is set, the geometry processor calculates the transposed inverse matrix for polygon normal vectors. If the Rotate Light bit is set, the geometry processor rotates the light vector from the eye coordinate set into model coordinate set. This is done by calculating the inverse of the Current Transformation Matrix. In other words, to transform point coordinates from a model coordinate set to the eye coordinate set, a concatenated transformation matrix is used, and for the reverse transformation, the inverse of the concatenated transformation matrix is used.

One simplification is used in the illustrated embodiment. The Invert Matrix function requires that the determinate of the Current Transformation Matrix be calculated, and each term divided by the determinate. In the illustrated embodiment, scaling of the transformed points is not important. Calculation of the determinate and the division process are not necessary, since they simply re-scale the inverse transformation matrix.

To calculate the inverse of the Current Transformation Matrix, the upper 3×3 portion of the transformation matrix that is present in the stack register file 216 is used. The nine cofactors of this matrix are then calculated in standard mathematical fashion. The modified inverse matrix "M" constitutes the transpose of the cofactors, as follows:

| C00 | C11 | C12 |
|-----|-----|-----|
| C01 | C11 | C21 |
| C02 | C12 | C22 |

This inverted transformation matrix "M" may then be used to multiply the light source vector to calculate the light vector in the model coordinate set. The transpose "TM" of the matrix "M" may be saved for later use to calculate polygon normals.

After the Matrix Invert packet comes the primitive data. There are two types of three-dimensional polygons, shaded and unshaded, in the preferred embodiment. There are also two additional primitive types which can be associated with the polygon, known as "shaded hole" and "unshaded hole" primitives.

For three-dimensional polygons, the first packet comprises thirty-two words and contains three or four vertices in the illustrated embodiment. Polygons with more than four vertices are continued in subsequent packets of sixteen words containing one or two vertices each.

For unshaded polygons, the first packet comprises sixteen words, and contains three vertices. Additional vertices are contained in subsequent, packets. The geometry processor stores the word count field of the packet flag word in the word count register 224, and uses it to determine the number of vertices in a packet.

The microsequencer 204 moves the opcode from each data packet into the opcode register 222. The opcodes in the data packet identify the face processing algorithm for each type of primitive. The geometry processor then uses the arithmetic pipeline 212 to calculate the two-dimensional coordinates of the points or vertices of each primitive, placing the final results of each computation into the output register file 220.

With the exception of a Backface Elimination test and calculation of depth plane coefficients, done at the beginning of polygon processing, the geometry processor 136 processes through polygons one vertex at a time, without storing an intermediate list of polygon vertices. The geometry processor takes one vertex point entirely through all processing and outputs edge data to the display processor 140 (if possible), before returning to process the next polygon vertex.

For each primitive data packet, a Backface Elimination test is performed. To do this, the first vertex of a polygon is transformed by the Current Transformation Matrix. Then, the polygon normal vector is transformed by the transposed inverted matrix "TM" (computed when the Matrix Invert opcode was received). The result is normalized, and the unrotated polygon normal vector is saved for possible later use. The dot product of the transformed first vertex with the transformed normal vector is then taken, and if the result is positive, the vertex is on the "back" side of the polygon. If the Backface Elimination flag is enabled for the segment, processing of the polygon is immediately stopped. If the result is positive and the Backface Elimination flag is not enabled, a Backface Present flag is set and the negated value of the dot product is saved for later use in calculating depth plane coefficients. If the dot product is negative, the vertex is on the front of polygon, and the value of the dot product is saved for later use in calculating the depth plane coefficients.

Next, the depth plane coefficients are calculated, which express depth of any point on a polygon as a function "f" of the X and Y screen coordinates of the point. If either the calculated X gradient or Y gradient is greater than one (indicating that the face of the polygon will be less than one pixel wide), then the polygon is discarded and processing is terminated for that segment.

The next step in the preferred embodiment is to transform each vertex point of the polygon by the Current Transformation Matrix Thereafter, the intensity of each vertex can be computed. In the preferred embodiment, all intensities are normalized to the range from zero (minimum intensity) to one (maximum intensity). The ambient illumination for a graphics object is stored in the viewport definition packet as a term "Ia". To calculate the intensity of each vertex from a light source "n", the following relationship is calculated:

$$Ivertex = Ia + Irn*(1+\cos\theta)/2$$

where:
$Irn = (1-Ia)*Iln =$ the maximum reflected intensity from light source "n", $Iln =$ the intensity of light source "n", and $\theta$ is the angle between the light source and the vertex.

The value of Ivertex ranges from zero to one, and is clamped to one if multiple light sources cause intensities that go higher than this range.

There are three possible shading cases based on the shading options that are enabled. If no shading is enabled for a segment, the intensity values for each vertex are set to zero. If flat, or faceted, shading is enabled, the intensity values for all of the vertices of a polygon will be the same. The shading model described above is used. The "$\cos\theta$" term is generated by taking the dot product of the polygon normal vector with the light source vector. This dot product must be done with both vectors in a common coordinate set. If done in a model coordinate set, the unrotated polygon normal (prior to Backface Elimination testing) must be saved.

If smooth shading (also known as "Gouraud" shading) is enabled for the segment, the intensity values for all vertices of a polygon would generally not be the same. The shading model described above is again used. The "$\cos\theta$" term for each vertex is generated by taking the dot product of the vertex normal vector with the light source vector. This is done in the model coordinate set using the unrotated vertex normal and the light source vector in the model which was calculated when the Matrix Invert opcode was received.

The next step performed by the geometry processor is clipping, in which each point defining a polygon is compared with previously defined clipping planes. Pseudo-edges may be formed from clipping the polygon against the right, left, top, and/or bottom clipping planes, which are flagged with a "pseudo-edge" bit. This will indicate to the display processor 140 not to highlight the pseudo-edges.

A vertex will propagate through the clipping plane algorithms and may or may not output a clipped point from the final clipping plane. If no point is output from the clipping algorithms, the next input vertex is fetched. If there is an output point from the clipping plane routine, the geometry processor proceeds to the next step, which is projection. If the projection type is perspective, then the X and Y values of each point are divided by the Z value for that point.

As the next step in the preferred embodiment, the X and Y coordinates are scaled and translated by the screen scaling and translation terms in accordance with the following equations:

$$Xscr = Xin*Xscrscale + Xscrtran$$

$$Yscr = Yin*Yscrscale + Yscrtran$$

"Xscr" means the value of X on the screen after the original X value ("Xin") is multiplied by a scaling value ("Xscrscale") and added to a translation value ("Xscrtran"). "Yscr" is similarly defined The transformed data is then formed into an edge packet to be transferred on to the display processor 140. In this formatting process, for every two vertex points, an edge is formed and top and bottom points are determined. Flags may be set to indicate whether the edge is a right edge, a left edge, or a horizontal edge. Each edge packet for a pair of vertices includes the coordinates of the screen pixel into which the top vertex of the edge projects, as well as the exact value of the X coordinate on the first display screen raster line that the edge crosses. The edge packet also contains the slope of the edge in pixels per raster line, and the change in intensity along the edge expressed in intensity change per raster line. Also included is the value of shading, or the intensity modifier of the polygon's color, as a function of light sources, at the top vertex. As each edge packet is calculated, it is sent to the display processor 140.

An intensity gradient is calculated from three non-colinear points in the polygon. If the first three points are colinear, the second through fourth points are tested, and so on, until three non colinear points are found. If three non colinear points cannot be found, the polygon is discarded. If three noncolinear points are found, the intensity gradient in the X direction is calculated as follows:

$$ds/dx = [(S2(Y3 - Y1) + S1(Y2 - Y3) + S3(Y1 - Y2)]/[X2(Y3 - Y1) + X1(Y2 - Y3) + X3(Y1 - Y2)]$$

If the polygon face processed is a backface, then the Backface Present Flag is set in the display packet and a polygon intensity gradient packet is sent to the display processor 140.

While this invention had been described with reference to a preferred embodiment, it is not intended that this description be construed in a limiting sense. Various modifications of the preferred embodiment as well as other embodiments of the invention, will be apparent to persons skilled in the art upon reference to this description. It is therefore contemplated that the appended claims will cover any modifications or embodiments as fall within the true scope of the invention.

I claim:

1. A programmable electronic geometry processor circuit for use in a graphics display system that includes a database memory for storing segments of graphics data which represent three-dimensional objects to be displayed and which contain operation codes pertaining to the objects, a first processing means for writing segments of graphics data into the memory, a second processing means responsive to the first processing means for sequentially fetching graphics data stored in the memory and placing such fetched graphics data on a dedicated memory bus, and a third processing means for accepting processed graphics data from the geometry processor for display on a display device, where the geometry processor includes:
   a. an input register means coupled to the memory by the dedicated memory bus, for temporarily storing graphics data fetched from the memory by the second processing means;
   b. a buffer register means coupled to the second processing means by a dedicated stack bus, for buffering data transferred between the second processing means and the geometry processor;
   c. an arithmetic pipeline module, coupled to the input and buffer register means, for mathematically processing graphics data temporarily stored in the input register means or the buffer register means;
   d. an output register means coupled to the arithmetic pipeline module and to the buffer register means, for temporarily storing the output of the arithmetic pipeline module; and
   e. a microcontroller means, coupled to the first and third processing means by a system bus, to the input, buffer, and output register means, and to the arithmetic pipeline module, for accepting from the first processing means a sequence of processing instructions, storing the instructions in an instruction memory, and selectively executing the instructions in response to the operation codes stored in each segment of graphics data, to:
      (1) select during a first processing phase from the input register means and temporarily transfer to the second processing means over the stack bus only segments containing data that is at least partly within a defined viewing volume,
      (2) accept during a second processing phase the selected segments from the second processing means over the stack bus and associated graphics data from the memory fetched by the second processing means over the dedicated memory bus, and use the arithmetic pipeline module to transform the graphics data from a three-dimensional representation to a two-dimensional representation, and
      (3) transfer the transformed graphics data to the third processing means over the system bus for display.

2. The geometry processor of claim 1, wherein the register means are double-buffered.

3. The geometry processor of claim 1, further including intermediate register means, coupled to the input of the arithmetic pipeline module and the output register means, for temporarily storing intermediate calculation values during processing of graphics data and selectively transferring intermediate calculation values to the arithmetic pipeline module for further processing.

4. The geometry processor of claim 2, wherein the arithmetic pipeline module comprises a dynamically reconfigurable calculation pipeline, including:
   a. a multiplier circuit, coupled to the inputs of the arithmetic pipeline module, for multiplying two input numbers;
   b. an accumulator circuit, coupled to the multiplier circuit, for adding a sequence of products from the multiplier circuit;
   c. a multifunction arithmetic logic unit, coupled to the inputs of the arithmetic pipeline module and to the output of the accumulator circuit, for selectively operating on input data or upon the output sum of the accumulator circuit;
   d. a linear approximation transform circuit, coupled to the output of the accumulator circuit, for selectively operating on the output sum of the accumulator circuit; and
   e. a bus buffer circuit, coupled to the output of the accumulator circuit, for selectively coupling the output sum of the accumulator circuit to the output register means.

5. The geometry processor of claim 1, further including a delay logic circuit coupled to the microcontroller means and the arithmetic pipeline module for selectively delaying the transmittal of portions of instructions to the arithmetic pipeline module to coincide with the processing of data therein.

6. A programmable electronic geometry processor circuit adapted for use in a graphics display system that includes a database memory for storing segments of graphics data which represent three-dimensional objects to be displayed and which contain operation codes pertaining to the objects, a first processing means for writing segments of graphics data into the memory, a second processing means responsive to the first processing means for sequentially fetching graphics data stored in the memory and placing such fetched graphics data on a dedicated memory bus, and a third processing means for accepting processed graphics data from the geometry processor for display on a display device, where the geometry processor includes:

a. a double buffered input register means coupled to the memory by the dedicated memory bus, for temporarily storing graphics data fetched from the memory by the second processing means;

b. a double buffered buffer register means coupled to the second processing means by a dedicated stack bus, for buffering data transferred between the second processing means and the geometry processor;

c. an arithmetic pipeline module, coupled to the input and buffer register means, for mathematically processing graphics data temporarily stored in the input register means or the buffer register means;

d. a double buffered output register means coupled to the arithmetic pipeline module and to the buffer register means, for temporarily storing the output of the arithmetic pipeline module;

e. an intermediate register means, coupled to the arithmetic pipeline module and the output register means, for temporarily storing intermediate calculation values during processing of graphics data;

f. a microcontroller means, coupled to the first and third processing means by a system bus, to the input, buffer, and output register means, and to the arithmetic pipeline module, for accepting from the first processing means a sequence of processing instructions, storing the instructions in an instruction memory, and selectively executing the instructions in response to the operation codes stored in each segment of graphics data, to:

(1) select during a first processing phase from the input register means and temporarily transfer to the second processing means over the stack bus only segments containing data that is at least partly within a defined viewing volume, (2) accept during a second processing phase the selected segments from the second processing means over the stack bus and associated graphics data from the memory fetched by the second processing means over the dedicated memory bus, and use the arithmetic pipeline module to transform the graphics data from a three-dimensional representation to a two-dimensional representation, and (3) transfer the transformed graphics data to the third processing means over the system bus for display.

7. The geometry processor of claim 6, wherein the arithmetic pipeline module comprises a dynamically reconfigurable calculation pipeline, including:

a. a multiplier circuit, coupled to the inputs of the arithmetic pipeline module, for multiplying two input numbers;

b. an accumulator circuit, coupled to the multiplier circuit, for adding a sequence of products from the multiplier circuit;

c. a multifunction arithmetic logic unit, coupled to the inputs of the arithmetic pipeline module and to the output of the accumulator circuit, for selectively operating on input data or upon the output sum of the accumulator circuit;

d. a linear approximation transform circuit, coupled to the output of the accumulator circuit, for selectively operating on the output sum of the accumulator circuit; and e. a bus buffer circuit, coupled to the output of the accumulator circuit, for selectively coupling the output sum of the accumulator circuit to the output register means.

8. The geometry processor of claim 6, further including a delay logic circuit coupled to the microcontroller means and the arithmetic pipeline module for selectively delaying the transmittal of portions of instructions to the arithmetic pipeline module to coincide with the processing of data therein.

* * * * *